(12) United States Patent
Liu et al.

(10) Patent No.: US 12,484,219 B2
(45) Date of Patent: Nov. 25, 2025

(54) THREE-DIMENSIONAL NAND MEMORY DEVICE AND METHOD OF FORMING THE SAME

(71) Applicant: Yangtze Memory Technologies Co., Ltd., Hubei (CN)

(72) Inventors: Shasha Liu, Hubei (CN); Xiaoming Mao, Hubei (CN); Jing Gao, Hubei (CN); Zongliang Huo, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 581 days.

(21) Appl. No.: 17/896,687

(22) Filed: Aug. 26, 2022

(65) Prior Publication Data

US 2024/0074176 A1   Feb. 29, 2024

(51) Int. Cl.
*H10B 43/20* (2023.01)
*G11C 8/14* (2006.01)
*G11C 16/08* (2006.01)

(52) U.S. Cl.
CPC .............. *H10B 43/20* (2023.02); *G11C 8/14* (2013.01); *G11C 16/08* (2013.01)

(58) Field of Classification Search
CPC ................................. H10B 43/20; H10B 43/27
See application file for complete search history.

(56) References Cited

U.S. PATENT DOCUMENTS

| | | | |
|---|---|---|---|
| 10,103,169 B1 * | 10/2018 | Ge | H10D 64/037 |
| 10,115,681 B1 * | 10/2018 | Ariyoshi | H10B 43/10 |
| 10,283,493 B1 * | 5/2019 | Nishida | H01L 25/0657 |
| 10,418,374 B2 * | 9/2019 | Lee | H10B 43/35 |
| 10,622,369 B2 * | 4/2020 | Zhou | H10B 43/50 |
| 10,658,377 B2 * | 5/2020 | Kubo | H10B 43/27 |
| 10,797,066 B2 * | 10/2020 | Lee | H10B 43/50 |
| 11,600,632 B2 * | 3/2023 | Cheon | H10B 43/27 |
| 2009/0242967 A1 * | 10/2009 | Katsumata | H10B 41/20 257/E21.409 |
| 2011/0316072 A1 * | 12/2011 | Lee | H10B 43/20 257/E27.06 |
| 2012/0003800 A1 * | 1/2012 | Lee | G11C 16/28 257/E21.645 |
| 2014/0264525 A1 * | 9/2014 | Takahashi | H10D 30/693 257/314 |
| 2015/0115455 A1 * | 4/2015 | Chen | H10B 43/50 257/773 |

(Continued)

*Primary Examiner* — Evren Seven
(74) *Attorney, Agent, or Firm* — Oblon, McClelland, Maier & Neustadt, L.L.P.

(57) ABSTRACT

A semiconductor device includes a first stack of alternating first word line layers and first insulating layers over a semiconductor layer. A first channel structure extends from the semiconductor layer and through a first array region of the first stack. A second stack of alternating second word line layers and second insulating layers are over the first stack. A second channel structure extends from the first channel structure and through a second array region of the second stack. A thickness of a particular first insulating layer, which is positioned closest to the second stack relative to other first insulating layers, is a sum of at least two times an average thickness of the other first insulating layers and at least one time an average thickness of the first word line layers in the first array region.

20 Claims, 14 Drawing Sheets

(56) References Cited

U.S. PATENT DOCUMENTS

| | | | |
|---|---|---|---|
| 2015/0236038 A1* | 8/2015 | Pachamuthu | H10B 43/20 257/326 |
| 2020/0194457 A1* | 6/2020 | Lee | H10B 43/10 |
| 2021/0305271 A1* | 9/2021 | Kim | H10B 43/27 |
| 2021/0384218 A1* | 12/2021 | Baek | H10B 43/10 |
| 2024/0074180 A1* | 2/2024 | Liu | H10B 43/27 |

* cited by examiner

THREE-DIMENSIONAL NAND MEMORY DEVICE AND METHOD OF FORMING THE SAME

BACKGROUND

As critical dimensions of devices in integrated circuits shrink to the limits of common memory cell technologies, designers have been looking to techniques for stacking multiple planes of memory cells to achieve greater storage capacity, and to achieve lower costs per bit. A 3D NAND memory device is an exemplary device of stacking multiple planes of memory cells to achieve greater storage capacity, and to achieve lower costs per bit.

SUMMARY

The present disclosure describes embodiments generally related to a dual deck structure of a 3D NAND memory device that has an improved overlap margin between an upper deck and a lower deck of the dual deck structure.

According to an aspect of the disclosure, a semiconductor device is provided. The semiconductor device includes a first stack of alternating first word line layers and first insulating layers over a semiconductor layer. The first stack includes a first array region and a first staircase region adjacent to the first array region. A first channel structure extends from the semiconductor layer and through the first array region of the first stack. A second stack of alternating second word line layers and second insulating layers are over the first stack. The second stack includes a second array region over the first array region and a second staircase region adjacent to the second array region and over the first staircase region. A second channel structure extends from the first channel structure and through the second array region of the second stack. A thickness of a particular first insulating layer, which is positioned closest to the second stack relative to other first insulating layers, is a sum of at least two times an average thickness of the other first insulating layers and at least one time an average thickness of the first word line layers in the first array region.

In some embodiments, a number of the first word line layers in the first array region of the first stack is less than a number of the first word line layers in the first staircase region of the first stack.

In some embodiments, the thickness of the particular first insulating layer in the first array region is equal to a sum of thicknesses of at least one first word line layer and at least two first insulating layers in the first staircase region.

In some embodiments, a slit structure extends from the semiconductor layer and through the first stack and the second stack.

In some embodiments, the particular first insulating layer in the first array region further includes a first layer, a second layer and a third layer. The second layer is sandwiched by the first layer and the third layer.

In some embodiments, the first layer extends into the first staircase region. The third layer extends into the first staircase region. The second layer, in the first staircase region, has a thickness equal to a sum of a thickness of a given first insulating layer positioned between the first layer and the third layer in the first staircase region and a thickness of two first word line layers positioned between the first layer and the third layer in the first staircase region.

In some embodiments, the first layer, the second layer, and the third layer are made of a same dielectric material.

In some embodiments, the first channel structure further includes a tapered profile that includes a first surface extending into the semiconductor layer and a second surface in contact with the second channel structure. The second surface has a larger critical dimension (CD) than the first surface. A first block layer is formed along sidewalls and over the first surface of the first channel structure. A first charge trapping layer is formed over the first block layer. A first tunneling layer is formed over the first charge trapping layer. A first channel layer is formed over the first tunneling layer.

In some embodiments, the second channel structure further includes a tapered profile that includes a first surface extending from the first channel structure and a second surface having a larger CD than the first surface of the second channel structure. The first surface of the second channel structure has a smaller CD than the second surface of the first channel structure. A second block layer is formed along sidewalls of the second channel structure and in contact with the first block layer. A second charge trapping layer is formed over the second block layer and in contact with the first charge trapping layer. A second tunneling layer is formed over the second charge trapping layer and in contact with the first tunneling layer. A second channel layer is formed over the second tunneling layer and in contact with the first channel layer. A channel contact is in contact with the second channel layer.

In some embodiments, the given first insulating layer in the first staircase region has a thickness between 19 nm and 21 nm, and the particular first insulating layer in the first array region has a thickness between 60 nm and 80 nm.

According to another aspect of the disclosure, a method of manufacturing a semiconductor device is provided. The method includes forming a first stack of alternating first sacrificial layers and first insulating layers over a substrate. The first stack includes a first array region and a first staircase region adjacent to the first array region. The first insulating layers include a particular first insulating layer which is positioned farthest from the substrate relative to other first insulating layers, a second first insulating layer under the particular first insulating layer, and a third first insulating layer under the second first insulating layer. A second stack of alternating second sacrificial layers and second insulating layers is formed over the first stack. The second stack includes a second array region over the first array region and a second staircase region adjacent to the second array region and over the first staircase region. The second sacrificial layers, the first sacrificial layers, and at least a portion of the second first insulating layer are removed in the first array region. Second word line layers are formed between the second insulating layers. First word line layers are formed between a subset of the first insulating layers which is positioned below the second first insulating layer. A dielectric layer is formed between the particular first insulating layer and the third first insulating layer after the portion of the second first insulating layer in the first array region is removed.

In some embodiments, the first stack of alternating first sacrificial layers and first insulating layers and the second stack of alternating second sacrificial layers and second insulating layers are formed before the first staircase region and the second staircase region are formed.

In some embodiments, the removing further includes forming a trench opening extending from the substrate and through the first stack and the second stack. An etching chemistry is introduced from the trench opening to remove the first sacrificial layers in the first array region and the first staircase region, the second sacrificial layers in the second array region and the second staircase region, and the second first insulating layer in the first array region.

In some embodiments, the forming the second word line layers and the first word line layers further includes filling empty space formed by the etching chemistry with a conductive material to form the second word line layers between the second insulating layers in the second array region and the second staircase region, the first word line layers between the first insulating layers in the first staircase region and between the subset of the first insulating layers in the first array region, and an intermediate word line layer between the particular first insulating layer and the third first insulating layer.

In some embodiments, the forming the dielectric layer further includes replacing the intermediate word line layer with a dielectric material, and depositing the dielectric material to fill in the trench opening to form a slit structure.

In some embodiments, a first channel structure is formed that has a tapered profile and extends from the substrate and through the first array region of the first stack. A second channel structure is formed that has a tapered profile and extends from the first channel structure and through the second array region of the second stack.

In some embodiments, the forming the first stack further includes forming the second first insulating layer that has a density lower than densities of other first insulating layers of the first insulating layers.

In some embodiments, the second first insulating layer has a thickness between 19 nm and 21 nm, and the dielectric layer has a thickness between 60 nm and 80 nm.

In some embodiments, a thickness of the dielectric layer is equal to a sum of a thickness of the second first insulating layer and a thickness of two first word line layers.

According to yet another aspect of the disclosure, a memory system device is provided. The memory system device includes control circuitry coupled with a memory device. The memory device includes a first stack of alternating first word line layers and first insulating layers over a semiconductor layer. The first stack includes a first array region and a first staircase region adjacent to the first array region. A first channel structure extends from the semiconductor layer and through the first array region of the first stack. A second stack of alternating second word line layers and second insulating layers are over the first stack. The second stack includes a second array region over the first array region and a second staircase region adjacent to the second array region and over the first staircase region. A second channel structure extends from the first channel structure and through the second array region of the second stack. A thickness of a particular first insulating layer, which is positioned closest to the second stack relative to other first insulating layers, is a sum of at least two times an average thickness of the other first insulating layers and at least one time an average thickness of the first word line layers in the first array region.

BRIEF DESCRIPTION OF THE DRAWINGS

Aspects of the present disclosure can be understood from the following detailed description when read with the accompanying figures. It is noted that, in accordance with the standard practice in the industry, various features are not drawn to scale. In fact, the dimensions of the various features may be increased or reduced for clarity of discussion.

DETAILED DESCRIPTION

Figure 1:
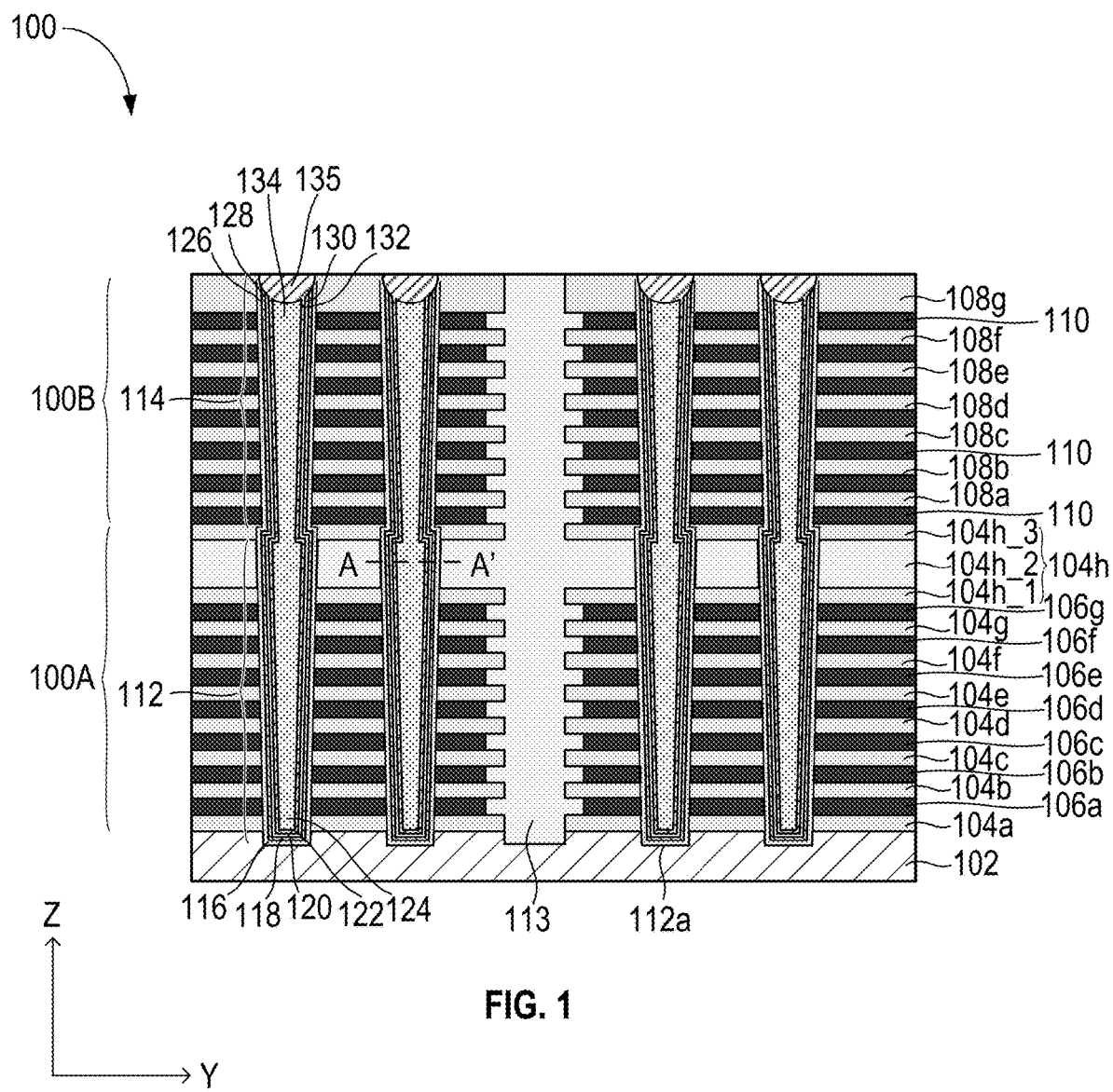
FIG. 1 is a cross-sectional view of an array region of a 3D NAND memory device, in accordance with exemplary embodiments of the disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features may be in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A 3D NAND memory device can include a lower deck and an upper deck. The lower deck can include a lower stack of alternating lower word line layers and lower insulating layers over a substrate. The lower stack can include a lower array region and a lower staircase region that is adjacent to the lower array region. Lower channel structures can extend from the substrate and through the lower word line layers and the lower insulating layers in the lower array region. The upper deck can include an upper stack of alternating upper word line layers and upper insulating layers over the lower stack. The upper stack can include an upper array region over the lower array region, and an upper staircase region adjacent to the upper array region and over the lower staircase region. Upper channel structures can extend from the lower channel structures and through the upper word line layers and the upper insulating layers in the upper array region. Each of the upper channel structures can extend from, or be otherwise connected to, a respective lower channel structure. Thus, a good alignment (or overlap) between the upper channel structures and the lower channel structures is required.

In a related example, when a poor overlap occurs between an upper channel structure and a lower channel structure, the upper channel structure may extend past the lower channel structure and extend into an adjacent lower word line layer resulting in an enlarged top critical dimension (CD) of the lower channel structure, which can result in voids in the adjacent word line layer and cause a word line leakage. In the disclosure, a thicker lower insulating layer (e.g., an uppermost lower insulating layer) in the lower array region can be formed at an interface (or joint) area between the upper channel structures and the lower channel structures. When the poor overlap occurs between the upper channel structure and the lower channel structure, the upper channel structure can extend into the thicker lower insulating layer rather than the adjacent lower word line layer. Accordingly, an electrical leakage in the adjacent lower word line layer or an electrical short between the upper channel structure and the adjacent lower word line layer can be prevented.

In the disclosure, the thickness of the thicker lower insulating layer in the lower array region can be greater than the thickness of at least one of the lower insulating layers. The thickness can be 3 to 4 times larger than other lower insulating layers in the lower array region in some embodiments. For example, the thicker lower insulating layer can have a thickness between 60 nm and 80 nm, and the other lower insulating layers in the lower array region can have a thickness between 19 nm and 21 nm. However, the lower insulating layers in the lower staircase region can have a substantially same thickness, such as a thickness between 19 nm and 21 nm. The lower insulating layers with a uniform thickness in the lower staircase region can help an etching process to form stairs in the lower staircase region.

FIG. 1 is a cross-sectional view of an array region of a 3D NAND memory device (or device 100), in accordance with exemplary embodiments of the disclosure. As shown in FIG. 1, the device 100 can include have a dual deck structure that includes a lower deck over a substrate 102 and an upper deck over the lower deck. The lower deck can include a lower stack (or first stack) 100A of alternating lower word line layers 106a-106g and lower insulating layers 104a-104h over the substrate 102, and lower channel structures 112 extending from the substrate 102 and through the lower insulating layers 104a-104h and the lower word line layers 106a-106g. The upper deck can include an upper stack (or second stack) 100B of alternating upper word line layers 110 and upper insulating layers 108a-108g over the lower stack 100A, and upper channel structures 114 extending from the lower channel structures 112 and through the upper word line layers 110 and the upper insulating layers 108a-108g. It should be noted that FIG. 1 is merely an example, and the device 100 can include any number of lower insulating layers, lower word line layers, upper insulating layers, and upper word line layers.

In the device 100, an uppermost lower insulating layer 104h (also referred to as a particular first insulating layer) in the lower stack 100A can be thicker than any one of the lower insulating layers 104a-104g. As shown in FIG. 1, the uppermost lower insulating layer 104h can include a bottom layer 104h_1 positioned over an uppermost lower word line layer 106g in the lower stack 100A, a middle layer 104h_2 positioned over the bottom layer 104h_1, and a top layer 104h_3 positioned between the middle layer 104h_2 and a lowermost upper word line layer 110. In some embodiments, a thickness of the bottom layer 104h_1 and a thickness of the top layer 104h_3 can be substantially the same as a thickness of any one of the lower insulating layers 104a-104g. The middle layer 104h_2 can have a thickness equal to a sum of the thickness of any one of the lower insulating layers 104a-104g and a thickness of two lower word line layers, such as 106f and 106g.

In some embodiments, the bottom layer 104h_1, the top layer 104h_3, and the middle layer 104_2 can be made of a same dielectric material as the other lower insulating layers, such as SiO. In some embodiments, the middle layer 104_2 can be made of a different dielectric material from the bottom layer 104h_1 and the top layer 104h_2. For example, the material of the middle layer 104_2 can include SiN, SiC, SiON, SiCN, SiCON, or the like.

The device 100 can include a slit structure 113 extending from the substrate 102 and through the lower stack 100A and the upper stack 100B in a vertical direction (e.g., Z direction) perpendicular to the substrate 102. The slit structure can further extend into the lower word line layers 106a-106g and the upper word line layers 110 in a horizontal direction (e.g., Y direction) parallel to the substrate 102. In some embodiments, the slit structure 113 can be made of a same dielectric material as the middle layer 104_2, such as SiO.

Figure 2A:
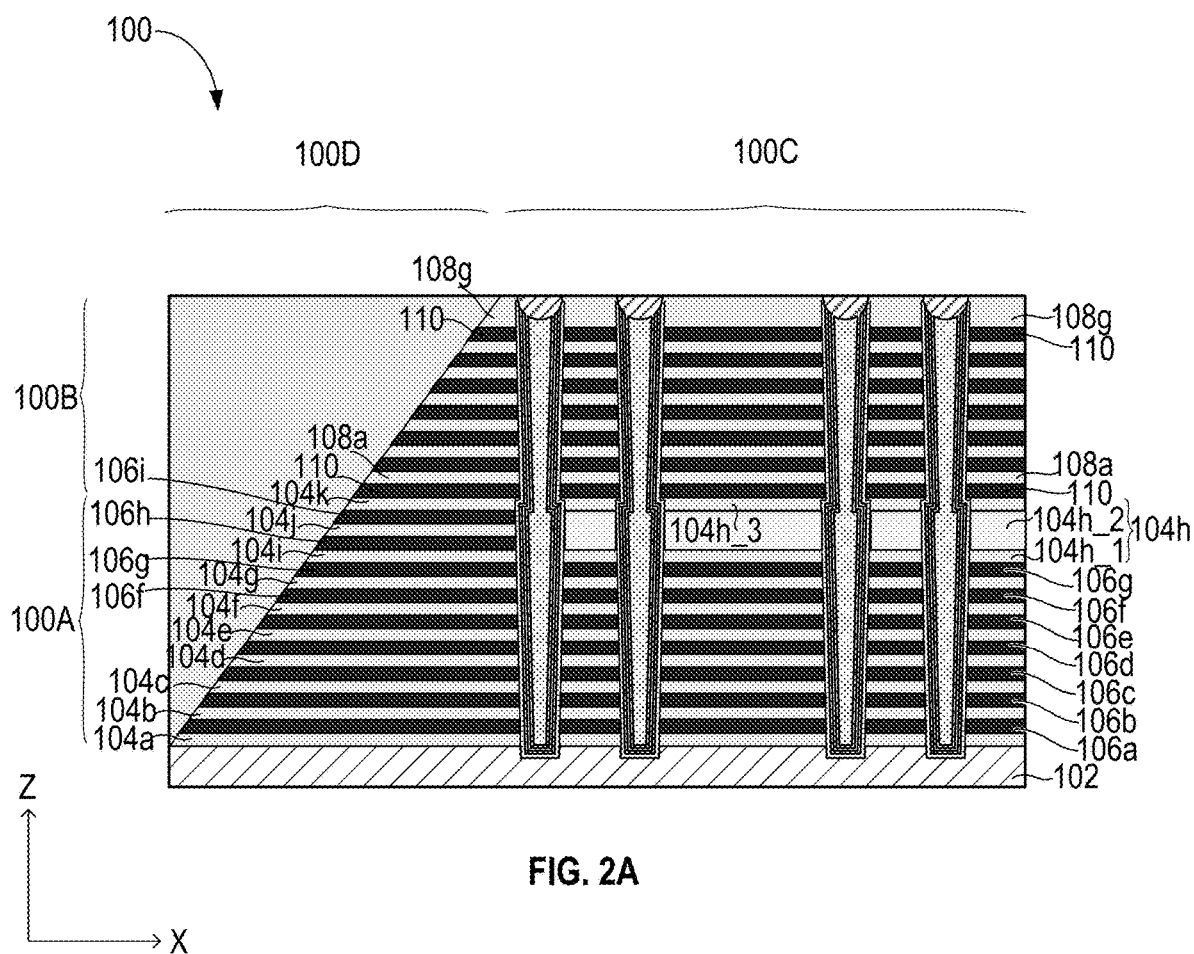
FIG. 2A is a cross-sectional view of an array region and a staircase region of a 3D NAND memory device, in accordance with exemplary embodiments of the disclosure.
Figure 2B:
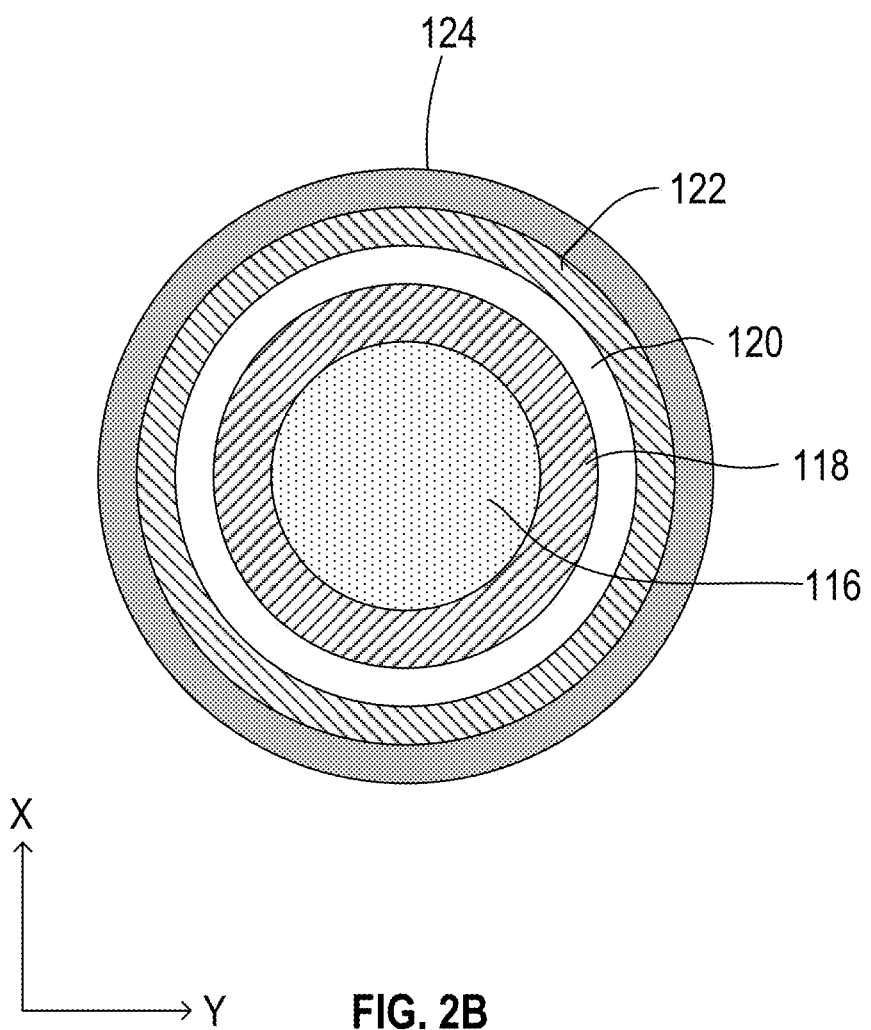
FIG. 2B is a cross-sectional view taken along the line cut AA' in FIG. 1, in accordance with exemplary embodiments of the disclosure.

FIG. 2B is a cross-sectional view of the lower channel structure 112, taken along the line cut AA' in FIG. 1, in accordance with exemplary embodiments of the disclosure. Each of the lower channel structures 112 can have a tapered profile and include a bottom surface 112a positioned in the substrate 102 and a top surface in contact with a respective upper channel structure 114, where the top surface can have a larger critical dimension (CD) than the bottom surface. Each of the lower channel structures 112 can have a first block layer 116 formed along sidewalls and over the bottom surface 112a of the corresponding lower channel structure, a first charge trapping layer 118 formed over the first block layer 116, a first tunneling layer 120 formed over the first charge trapping layer 118, and a first channel layer 122 formed over the first tunneling layer 120. Each of the lower channel structures 112 can also include a first isolation layer 124 formed over the first channel layer 122. While the first block layer 116, the first charge trapping layer 118, the first tunneling layer 120, the first channel layer 122 and the first isolation layer 124 are shown to be circular in the example of FIG. 2B, it should be understood that the first block layer 116, the first charge trapping layer 118, the first tunneling layer 120, the first channel layer 122 and the first isolation layer 124 may have any suitable shape.

Each of the upper channel structures 114 can also have a tapered profile and include a bottom surface on a respective lower channel structure 112 and a top surface level with a top surface of an uppermost upper insulating layer 108g, where the top surface of the corresponding upper channel structure 114 can have a larger CD than the bottom surface of the corresponding upper channel structure 114, and the bottom surface of the corresponding upper channel structure 114 can have a smaller CD than the top surface of the respective lower channel structure 112. Each of the upper channel structures 114 can have a second block layer 126 formed along sidewalls and in contact with the first block layer 116, a second charge trapping layer 128 formed over the second block layer 126 and in contact with the first charge trapping layer 118, a second tunneling layer 130 formed over the second charge trapping layer 128 and in contact with the first tunneling layer 120, and a second channel layer 132 formed over the second tunneling layer 130 and in contact with the first channel layer 122. Each of the upper channel structures 114 can further include a second isolation layer 134 formed along sidewalls of the second channel layer 132 and over the first isolation layer 124, and a channel contact 135 in contact with the second channel layer 132 and surrounded by the uppermost upper insulating layer 108g. While a cross-sectional view of the upper channel structures 114 is not provided, it should be understood that the upper channel structures 114 can have similar shapes to the lower channel structures 112 as shown in FIG. 2B. Alternatively, the upper channel structures 114 can have different shapes from the lower channel structures 112.

FIG. 2A is a cross-sectional view of an array region 100C and a staircase region 100D of the device 100, in accordance with exemplary embodiments of the disclosure. As shown in FIG. 2A, in the lower stack 100A of the device 100, the number of the lower word line layers in the array region 100C is less than the number of lower word line layers in the staircase region 100D. For example, the lower stack 100A includes the lower word line layers 106a-106g in the array region 100C and the lower word line layers 106a-106i in the staircase region 100D. Thus, a difference in the number of the lower word line layers in the array region 100C of the lower stack 100A and the number of the lower word line layers in the staircase region 100D of the lower stack 100A can be two. The difference can be a multiple of two or greater than two in other embodiments.

Still referring to FIG. 2A, in the lower stack 100A of the device 100, a thickness of an uppermost lower insulating layer 104h in the array region 100C can be greater than a thickness of an uppermost lower insulating layer 104k in the staircase region 100D. For example, the thickness of the uppermost lower insulating layer 104h in the array region 100C can be equal to a sum of thicknesses of three lower insulating layers 104i-104k in the staircase region 100D and thicknesses of two lower word line layers 106h-106i in the staircase region 100D. In addition, the bottom layer 104h_1 can have a same thickness as the lower insulating layer 104i in the staircase region 100D and further in contact with the lower insulating layer 104i, the top layer 104h_3 can have a same thickness as the uppermost lower insulating layer 104k in the staircase region 100D and further in contact with the uppermost lower insulating layer 104k, and the middle layer 104h_2 can have a thickness equal to a sum of a thickness of the lower insulating layer 104j in the staircase region 100D and thicknesses of two lower word line layers 106h-106i in the staircase region 100D.

In some embodiments, the uppermost lower insulating layer 104k in the staircase region 100D can have a thickness between 19 nm and 21 nm, and the uppermost lower insulating layer 104h in the array region 100C can have a thickness of about at least three times an average thickness of lower insulating layers 104a-104g, for example between 60 nm and 80 nm. Additionally, the uppermost lower insulating layer 104h (or the particular first insulating layer) in the array region 100C can have a thickness that is a sum of at least two times an average thickness of lower insulating layers 104a-104g and at least one time an average thickness of the lower word line layers 106a-106g. The average thickness of lower insulating layers 104a-104g can be between 19 nm and 21 nm.

As shown in FIG. 2A, a thicker lower insulating layer (e.g., the uppermost lower insulating layer 104h) can be formed in an interface (or joint) area between the upper channel structures 114 and the lower channel structures 112. When a poor overlap occurs between an upper channel structure and a lower channel structure, the upper channel structure can extend into the thicker lower insulating layer rather than an adjacent lower word line layer. Accordingly, an electrical leakage in the adjacent lower word line layer or an electrical short between the upper channel structure and the adjacent lower word line layer can be prevented. The thickness of the thicker lower insulating layer can be varied based on an expected extension due to poor overlap. In the staircase region 100D, the lower insulating layers (e.g., 104a-104g and 104i-104k) in the lower stack 100A can have a substantially same thickness. The lower insulating layers with a uniform thickness in the staircase region 100D can help an etching process to form stairs in the staircase region.

Figure 3:
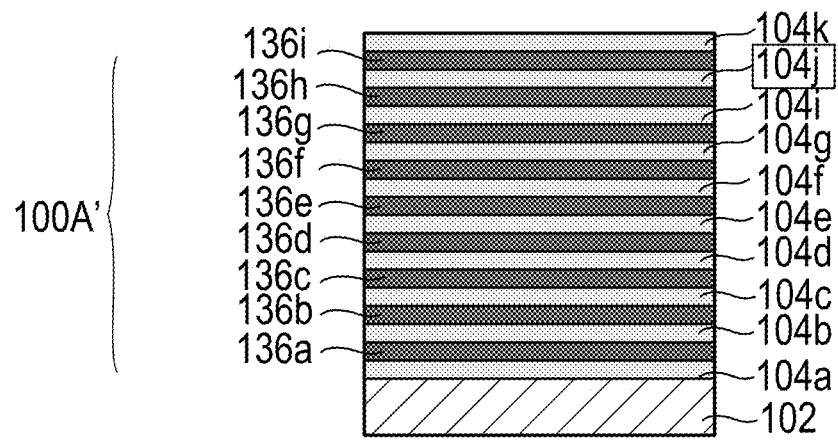
FIGS. 3-12 are cross-sectional views of various intermediate steps of manufacturing a 3D NAND memory device, in accordance with exemplary embodiments of the disclosure.

FIGS. 3-12 are perspective views of various intermediate steps of forming, or otherwise manufacturing, the device 100, in accordance with exemplary embodiments of the disclosure. In FIG. 3, a lower stack (or first stack) 100A' of alternating lower sacrificial layers (e.g., 136a-136i) and lower insulating layers (e.g., 104a-104g and 104i-104k) can be formed over a substrate 102. The lower insulating layers can include an uppermost lower insulating layer 104k, a second lower insulating layer 104j under the uppermost lower insulating layer 104k, and a third lower insulating layer 104i under the second lower insulating layer 104j. The lower insulating layers can be made of SiO and the lower sacrificial layers can be made of SiN. In order to form the lower sacrificial layers and the lower insulating layers, any suitable deposition processes can be applied, such as a chemical vapor deposition (CVD), a physical vapor deposition (PVD), an atomic layer deposition (ALD), a thermal oxidation, an e-beam evaporation, a sputtering, a diffusion, or any combination thereof. In some embodiments, one or more of the lower insulating layers can have lower densities than the densities of the remaining lower insulating layers. For example, the second lower insulating layer 104j can have a lower density than densities of other lower insulating layers (e.g., 104a-104g, 104i, or 104k). In another example, the second lower insulating layer 104j and the third lower insulating layer 104i can have a density less than the densities of other insulating layers. Accordingly, an etch rate of the one or more lower insulating layers (e.g., the second lower insulating layer 104j) can be larger than etch rates of the other lower insulating layers. To form the one or more lower insulating layers with a porous or loosen structure, process conditions of the deposition process mentioned above can be adjusted. The process conditions can include a deposition rate, a deposition pressure, a deposition temperature, a deposition gas, the like, or a combination thereof.

Figure 4:
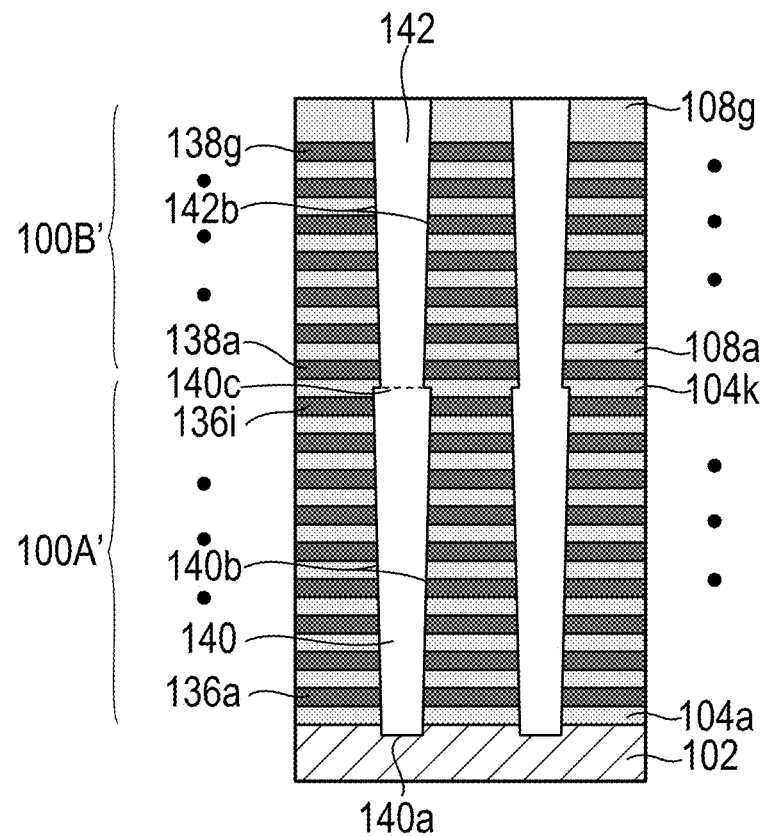

In FIG. 4, lower channel openings 140 can be formed. Each of the lower channel openings 140 can include sidewalls 140b extending through the lower sacrificial layers and the lower insulating layers, and a bottom 140a extending into the substrate 102. To form the lower channel openings 140, a mask layer (not shown) can be formed by a photolithography process and an etching process can subsequently be applied to form the lower channel openings 140 based on the mask layer. The lower channel openings 140 can have a tapered profile such that a CD of the bottom 140a is smaller than a CD of a top region 140c of the lower channel openings 140. Further, an upper stack (or second stack) 100B' of alternating upper sacrificial layers (e.g., 138a-138g) and upper insulating layers (e.g., 108a-108g) can be formed over the lower stack 100A'. Upper channel openings 142 can be formed in the upper stack 100B'. Each of the upper channel openings 142 can include sidewalls 142b extending through the upper sacrificial layers and the upper insulating layers, and a bottom extending from a top region 104c of a respective lower channel structure. The upper channel openings 142 can have a tapered profile such that a CD of the bottom is smaller than a CD of a top region, where the top region can be level with an uppermost upper insulating layer 108g.

Figure 5:
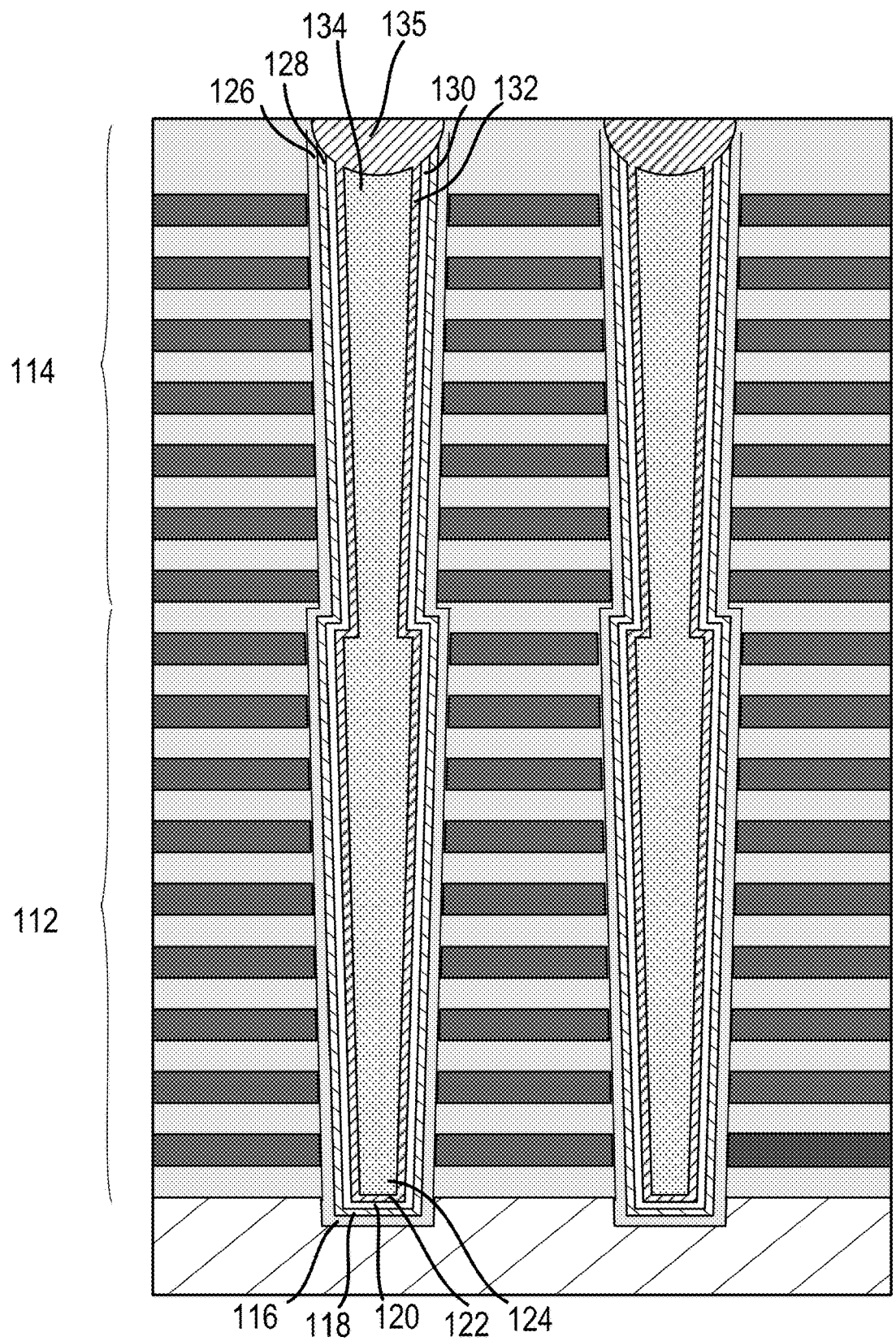

In FIG. 5, a first block layer 116 can be formed along sidewalls 140b and over the bottoms 140a of the lower channel openings 140, a first charge trapping layer 118 can be formed over the first block layer 116, a first tunneling layer 120 can be formed over the first charge trapping layer 118, and a first channel layer 122 can be formed over the first tunneling layer 120. Further, a first isolation layer 124 can be formed over the first channel layer 122. Accordingly, lower channel structures 112 can be formed that can have similar features to the lower channel structures 112 in FIG. 1. Further, a second block layer 126 can be formed along sidewalls 142b of the upper channel openings 142 and in contact with the first block layer 116, a second charge trapping layer 128 formed over the second block layer 126 and in contact with the first charge trapping layer 118, a second tunneling layer 130 formed over the second charge trapping layer 128 and in contact with the first tunneling layer 120, and a second channel layer 132 formed over the second tunneling layer 130 and in contact with the first channel layer 122. In addition, a second isolation layer 134 can be formed along sidewalls of the second channel layer 132 and over the first isolation layer 124, and a channel contact 135 can be formed to contact the second channel layer 132 and be surrounded by the uppermost upper insulating layer 108g. Accordingly, upper channel structures 114 can be formed that can have similar features to the upper channel structures 114 in FIG. 1.

In some embodiments, the layers of the upper channel structures and the layers of the lower channel structures can be formed using the same processes. For example, the first block layer 116 and the second block layer 126 can be formed by a same deposition process. In some embodiments, the layers of the upper channel structures and the layers of the lower channel structures can be formed in separate processes. Thus, the first block layer 116 can be formed by a first deposition process, and the second block layer 126 can be formed by a second deposition process.

Figure 6:
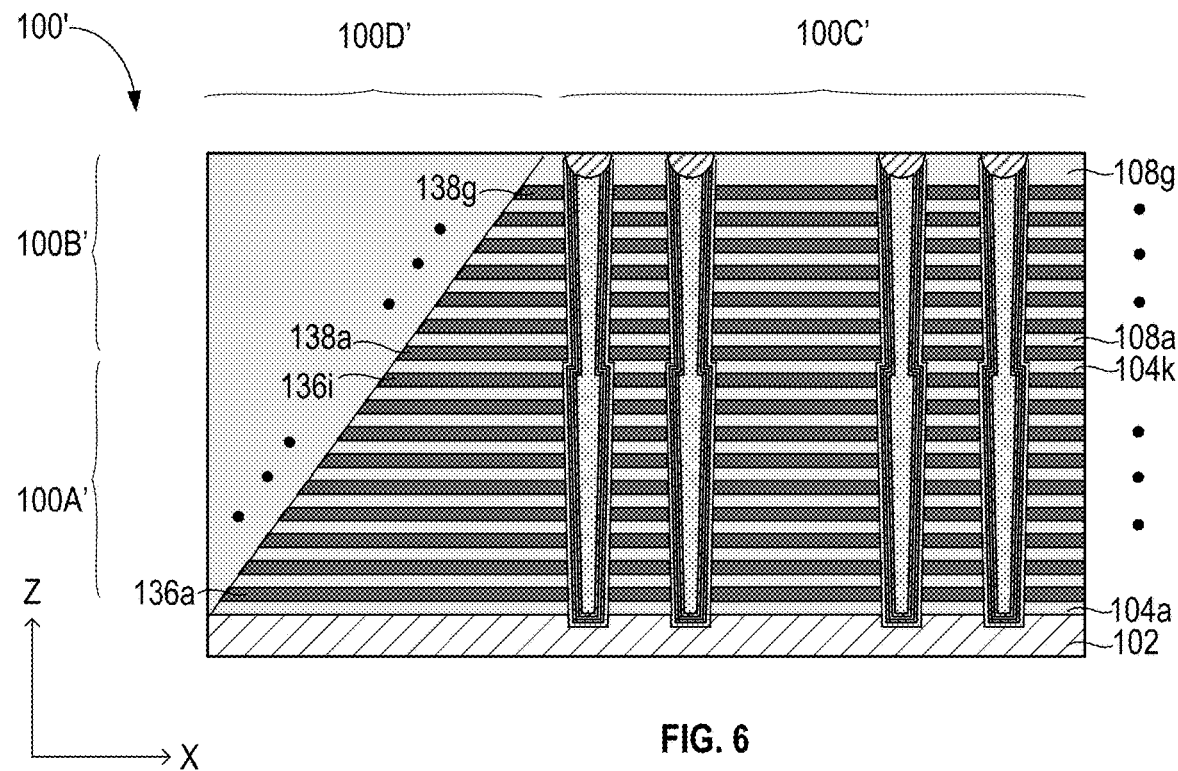
Figure 7:
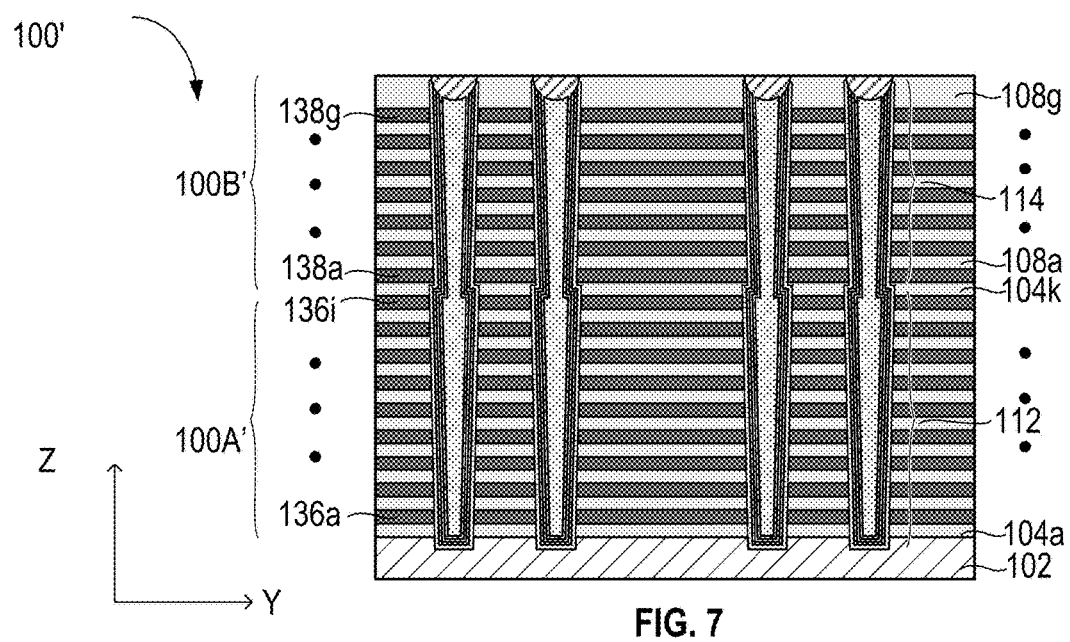

FIG. 6 shows a cross-sectional view of a semiconductor structure (or structure) 100' obtained along the X direction. FIG. 7 shows a cross-sectional view of the structure 100' obtained along the Y direction. As shown in FIGS. 6-7, The structure 100' can include the lower stack 100A', the upper stack 100B' over the lower stack 100A', the lower channel structures 112 formed in the lower stack 100A', and the upper channel structures 114 formed in the upper channel structures 100B' and positioned over the lower channel structures 112. The structure 100' can include an array region 100C' in which the lower channel structures 112 and the upper channel structures are positioned, and a staircase region 100D' that is positioned adjacent to and in contact with the array region 100C'.

Figure 8:
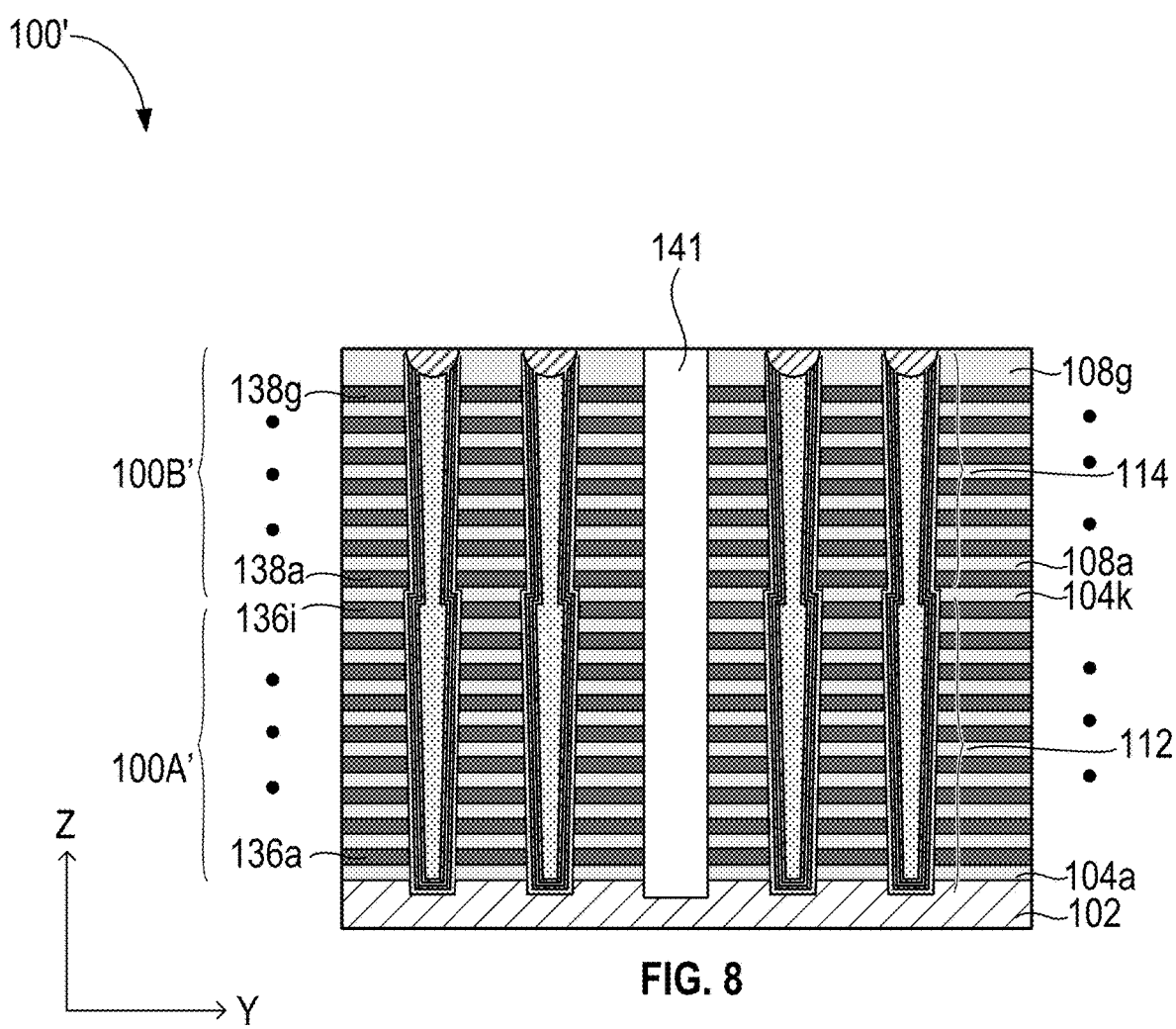

In FIG. 8, a trench opening 141 can be formed to extend through the lower stack 100A' and the upper stack 100B'. In some embodiments, the trench opening 141 can further extend into the substrate 102. To form the trench opening 141, a mask with patterns (not shown) can be formed over the upper stack 100B' by a photolithography process, and an etching process can subsequently be applied to transfer the patterns into the lower stack 100A' and the upper stack 100B' to form the trench opening 141.

Figure 9:
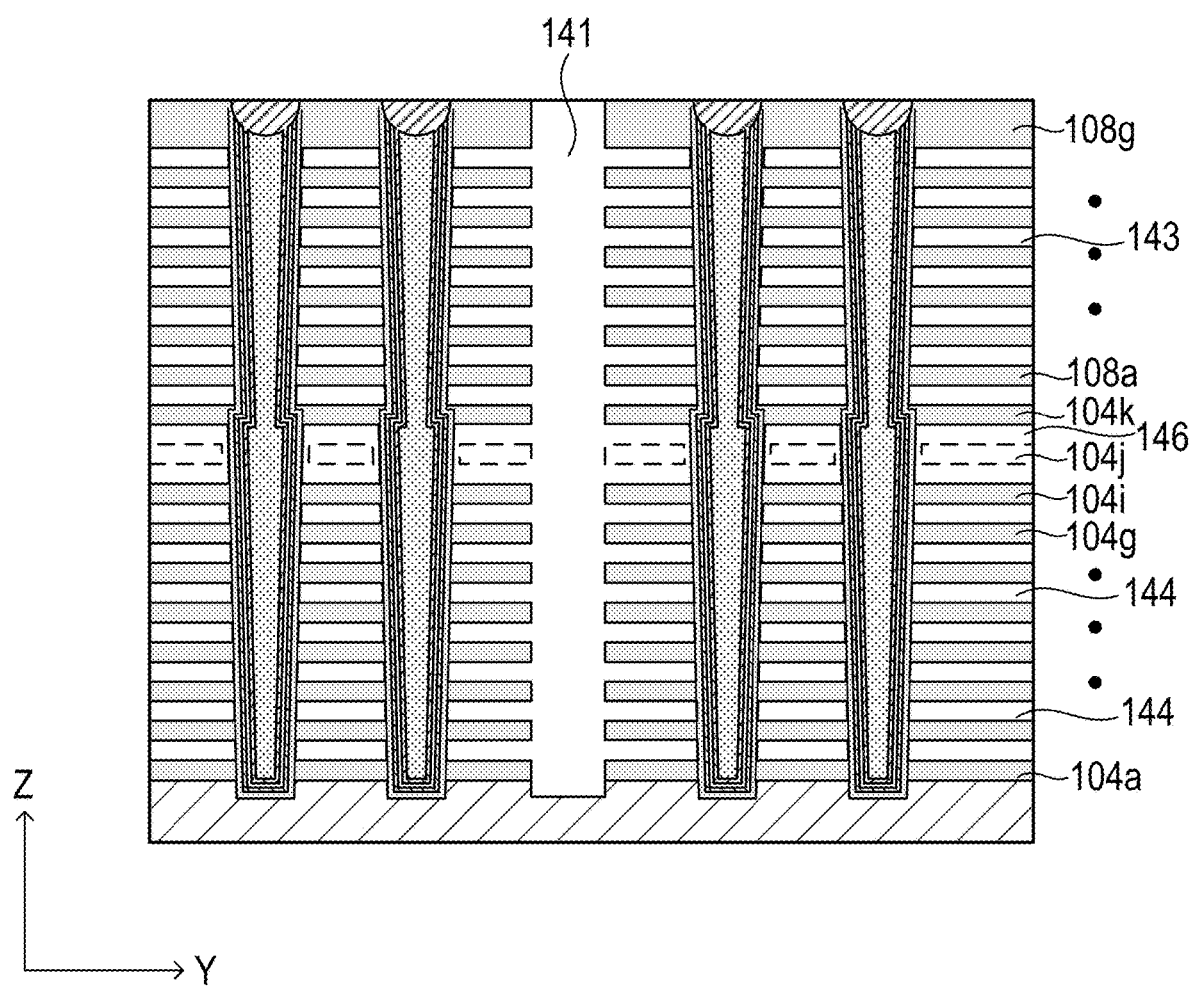

In FIG. 9, an etching chemistry, such as phosphoric acid, can be introduced from the trench opening 141 to remove the lower sacrificial layers 136a-136i and the upper sacrificial layers 138a-138g. The etching chemistry can be a selective such that the lower and upper sacrificial layers are removed and the lower and upper insulating layers are unaffected. However, the second lower insulating layer 104j has a lower density than other lower insulating layers, and the etching chemistry can further remove the second lower insulating layer 104j in the array region 100C'. The second lower insulating layer 104j in the staircase region 100D' can still remain by precisely controlling the etching time or by introducing a separation structure (not shown) between the array region 100C' and the staircase region 100D'. When the lower sacrificial layers 136a-136i, the upper sacrificial layers 138a-138g, and the second lower insulating layer 104j in the array region 100C' are removed, upper spaces 143 can be formed between the upper insulating layers 108a-108g in the array region 100C' and the staircase region 100D', first lower spaces (not shown) can be formed between the lower insulating layers 104a-104g and 104i-104k in the staircase region 100D', second lower spaces 144 can be formed between the lower insulating layers 104a-104g under the third lower insulating layer 104i in the array region 100C', and a third lower space 146 can be formed between the uppermost lower insulating layer 104k and the third lower insulating layer 104i in the array region 100C'.

In some embodiments, when the lower insulating layer 104i has a porous structure like the lower insulating layer 104j, the lower insulating layer 104i in the array region 100C' can also be removed. Thus, the third lower space 146 can be formed between the uppermost lower insulating layer 104k and the lower insulating layer 104g in the array region 100C'. One or more additional lower insulating layers can be removed in other embodiments.

Figure 10:
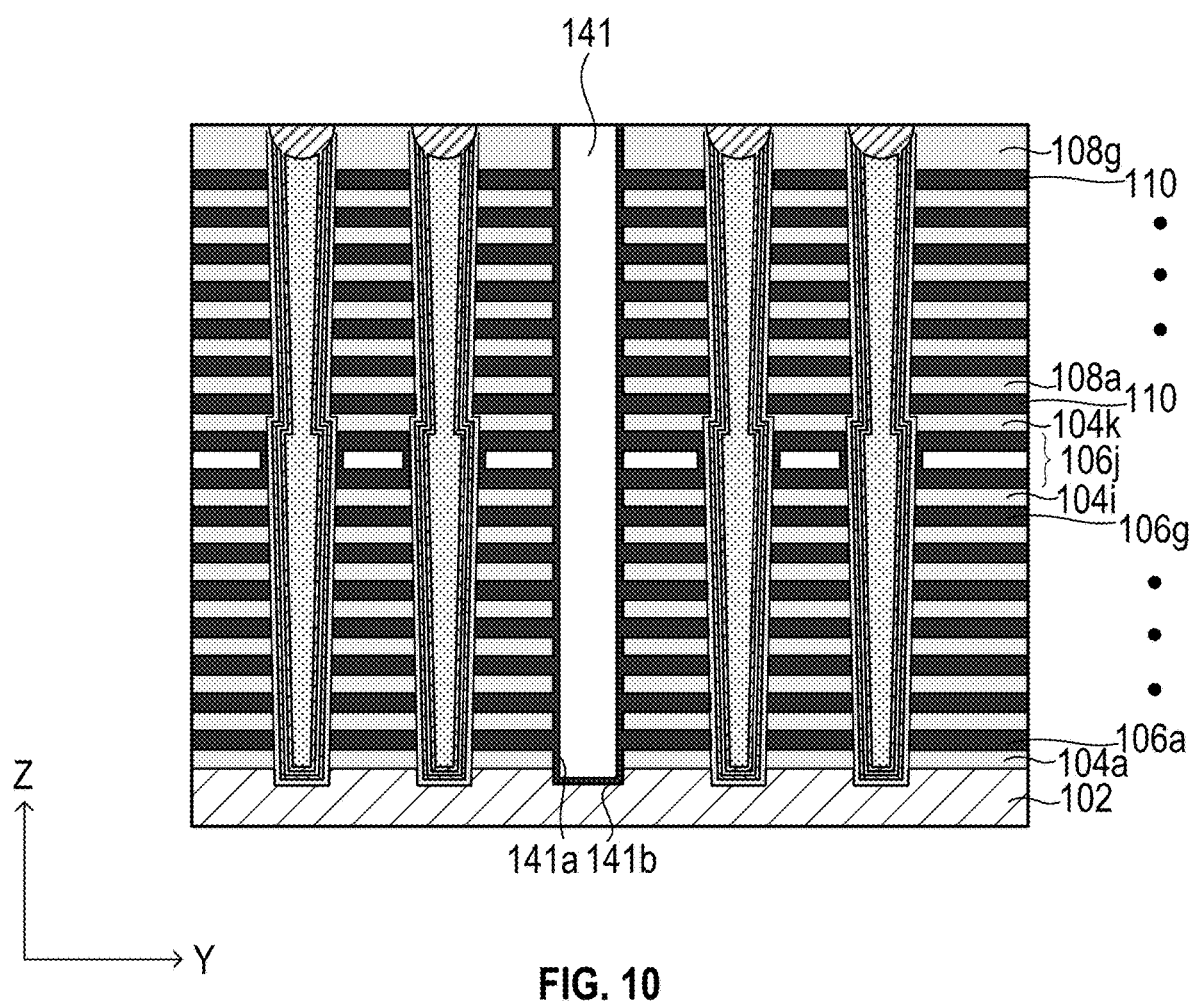

In FIG. 10, the upper spaces 143, the first lower spaces, the second lower spaces 144, and the third lower space 146 can be filled with a conductive material to form upper word line layers 110 in the upper spaces 143, lower word line layers 106a-106g in the second lower spaces 144, and lower word line layers 106a-106i (shown in FIG. 2A) in the first lower spaces. In addition, an intermediate word line layer 106j can be formed in the third lower space 146. The conductive material can further be formed along sidewalls 141a and a bottom 141b of the trench opening 141. The conductive material can include W, Co, Ru, Co, or the like.

Figure 11:
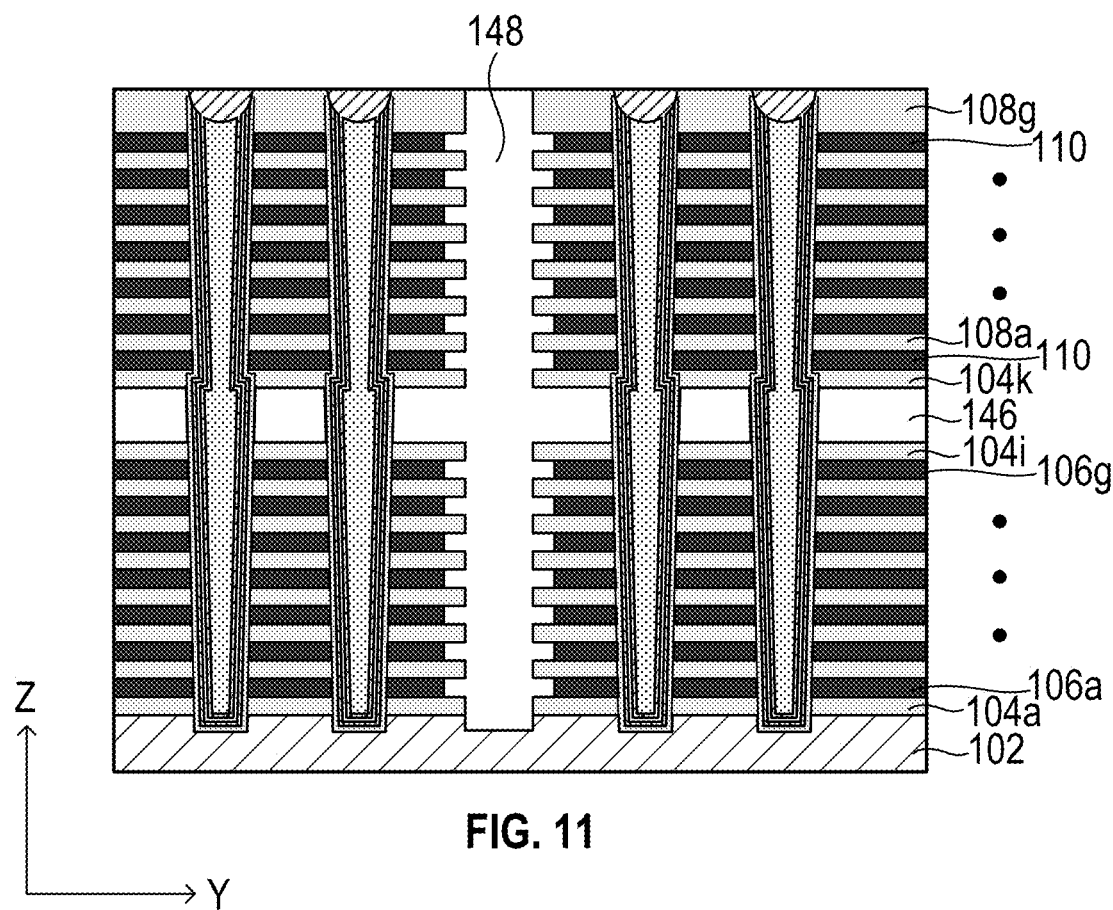

In FIG. 11, an etching process can be performed to remove the conductive material from the sidewalls 141a and the bottom 141b of the trench opening 141, and the intermediate word line layer 106j in the third lower space 146. The etching process can further recess the lower word line layers 106a-106g and the upper word line layers 110 from the sidewalls 141a of the trench opening 141 to form a slit opening 148. The slit opening 148 can extend from the substrate 102 and through the lower word line layers 106a-106g, the lower insulating layers 104a-104g, 104i, and 104k, the upper word line layers 110, and the upper insulating layers 108a-108g in the vertical direction (e.g., Z direction) perpendicular to the substrate 102. The slit opening 148 can further extend into the upper word line layers 110 and the lower word line layers 106a-106g in the horizontal direction (e.g., Y direction) parallel to the substrate 102.

Figure 12:
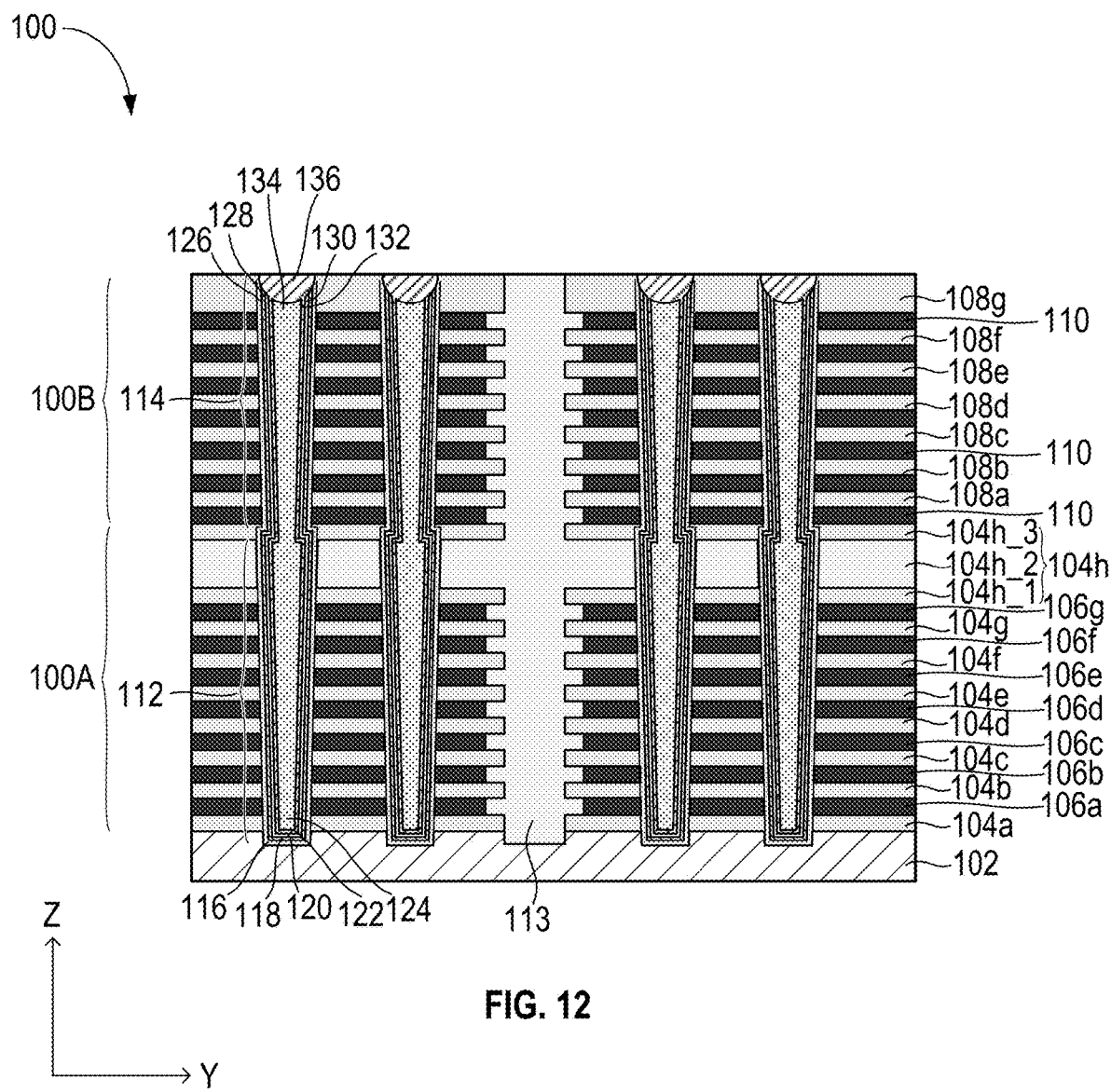

In FIG. 12, a dielectric material can be deposited to fill in the third lower space 146 to form a dielectric layer 104h_2. Accordingly, an uppermost lower insulating layer 104h can be formed. The uppermost lower insulating layer 104h can include a top layer 104h_i that can be the uppermost lower insulating layer 104k, a middle layer that can be the dielectric layer 104h_2, and a bottom layer 104h_3 that can be the third lower insulating layer 104i.

The dielectric material can further be filled in the slit opening 148 to form a slit structure 113. The slit structure 113 can extend from the substrate 102 and through the lower word line layers 106a-106g, the lower insulating layers 104a-104h, the upper word line layers 110, and the upper insulating layers 108a-108g in the Z direction. The slit structure 113 can further extend into the upper word line layers 110 and the lower word line layers 106a-106g in the Y direction. When the uppermost lower insulating layer 104h and the slit structure 113 are formed, a 3D NAND memory device (or device) 100 can accordingly be formed. The device 100 can have similar features to the device 100 shown in FIG. 1.

Figure 13:
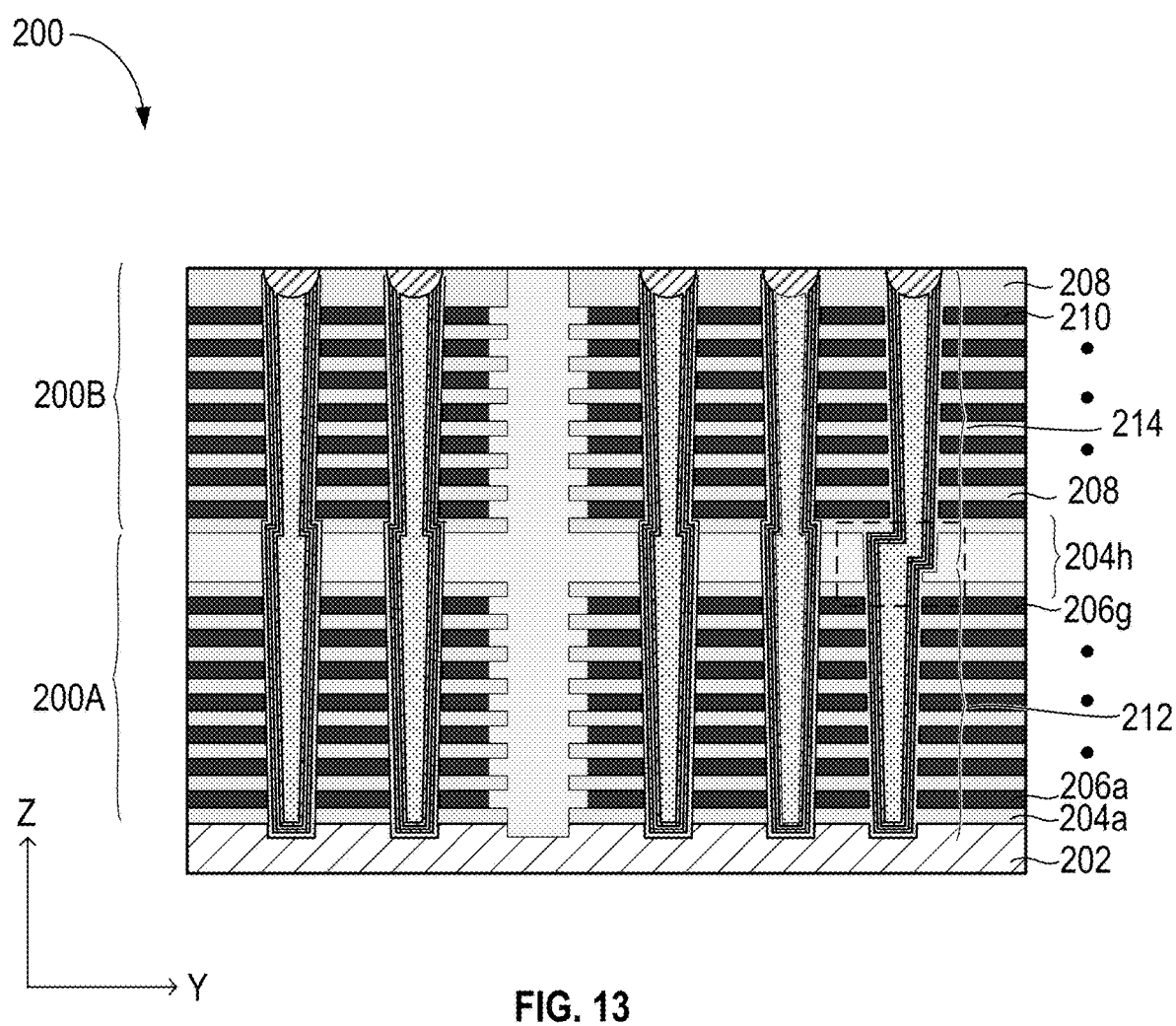
FIG. 13 is a cross-sectional view of a 3D NAND memory device with an example of a poor overlap, in accordance with exemplary embodiments of the disclosure.

FIG. 13 shows a cross-sectional view of a 3D NAND memory device (or device) 200. As shown in FIG. 13, the device 200 can include lower channel structures (e.g., 212) and upper channel structures (e.g., 214). The lower channel structures can extend from a substrate 202 and through lower word line layers 206a-206g and lower insulating layers 204a-204h. The upper channel structures can extend from the lower channel structures and through upper word line layers 210 and upper insulating layers 208. In the lower insulating layers, a thickness of an uppermost lower insulating layer 204h can be much larger than thicknesses of other lower insulating layers 204a-204g.

In a related example, when the upper channel structure 214 and the lower channel structure 212 have a poor overlap (or alignment), the upper channel structure 214 can fall off the lower channel structure 212 and extend into adjacent lower word line layers and the lower insulating layers that are positioned at the joint region of the upper channel structure 214 and the lower channel structure 212. Thus, a void can be formed in the adjacent lower word line layers, which can result in an electrical leakage in the adjacent first word line layers. In addition, an electrical short between the upper channel structure and the adjacent first word line layers can take place. In the device 200, because the uppermost lower insulating layer 204h have a larger thickness, the upper channel structure 214 can be trapped in the uppermost lower insulating layer 204h and prevented from contacting adjacent lower word line layers (e.g., 206g). Thus, the electric leakage or the electric short can be prevented.

Figure 14:
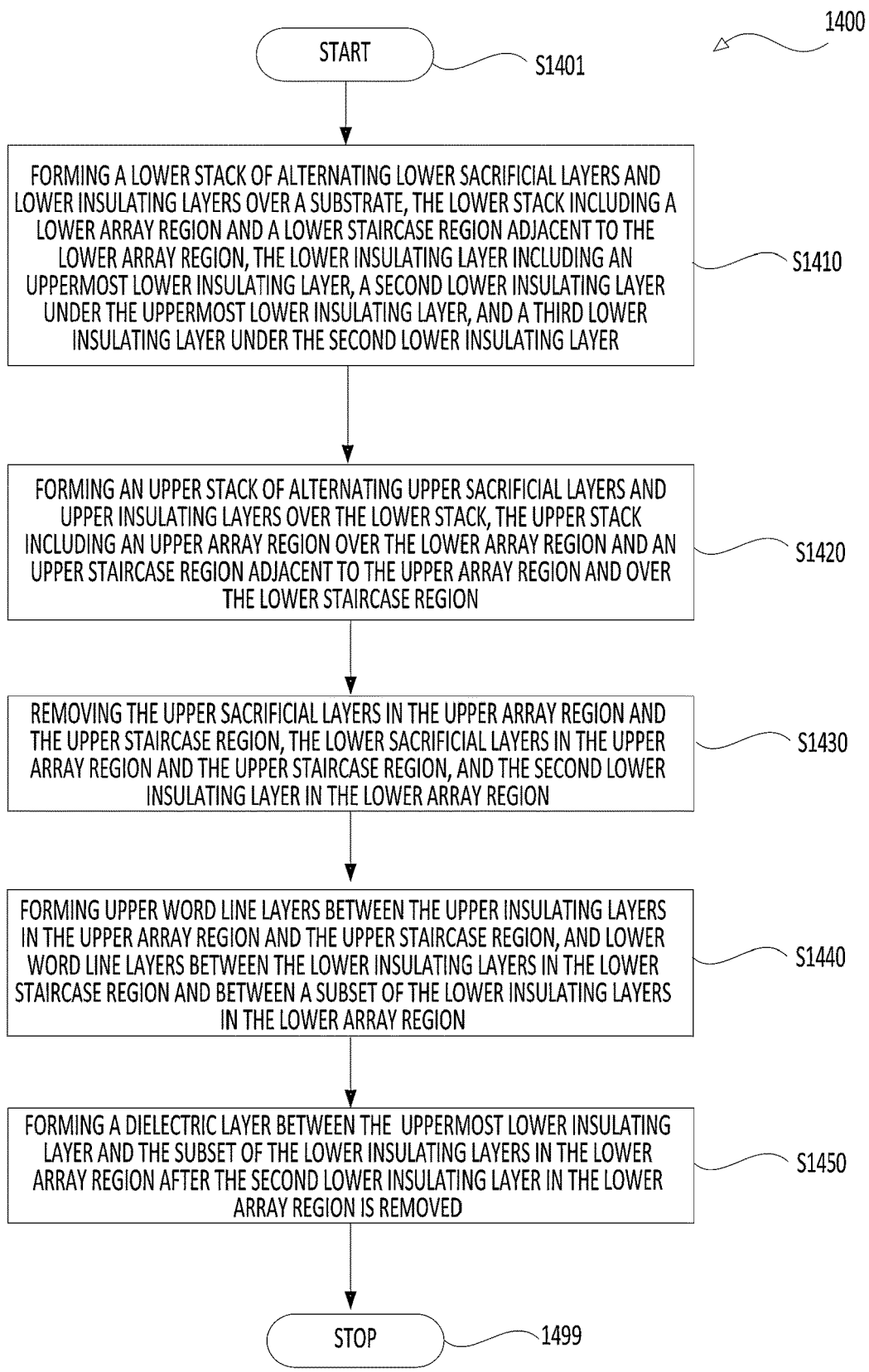
FIG. 14 is a flowchart of a process for manufacturing a 3D NAND memory device, in accordance with exemplary embodiments of the disclosure.

FIG. 14 is a flowchart of an exemplary process 1400 for fabricating a 3D NAND memory device. The process 1400 begins at S1401, and then proceeds to S1410. At S1410, a lower stack of alternating lower sacrificial layers and lower insulating layers can be formed over a substrate. The lower stack can include a lower array region and a lower staircase region adjacent to the lower array region. The lower insulating layer can include an uppermost lower insulating layer, a second lower insulating layer under the uppermost lower insulating layer, and a third lower insulating layer under the second lower insulating layer. In some embodiments, S1410 can be performed as illustrated with reference to FIG. 3.

At S1420, An upper stack of alternating upper sacrificial layers and upper insulating layers can be formed over the lower stack, where the upper stack can include an upper array region over the lower array region and an upper staircase region adjacent to the upper array region and over the lower staircase region. In some embodiments, S1420 can be performed as illustrated with reference to FIG. 4.

The process 1400 can proceed to S1430, where the upper sacrificial layers in the upper array region and the upper staircase region, the lower sacrificial layers in the upper array region and the upper staircase region, and the second lower insulating layer in the lower array region can be removed. In some embodiments, S1430 can be performed as illustrated with reference to FIGS. 8-9.

At S1440, upper word line layers can be formed between the upper insulating layers in the upper array region and the upper staircase region. Lower word line layers can be formed between the lower insulating layers in the lower staircase region and between a subset of the lower insulating layers in the lower array region. In some embodiments, S1440 can be performed as illustrated with reference to FIG. 10.

At S1450, a dielectric layer can be formed between the uppermost lower insulating layer and the subset of the lower insulating layers in the lower array region after the second lower insulating layer in the lower array region is removed. In some embodiments, S1450 can be performed as illustrated with reference to FIGS. 11-12.

In some embodiments, the lower word line layers can be positioned between the lower insulating layers in the lower staircase region and the lower insulating layers from the third lower insulating layer to a lowermost lower insulating layer in the lower array region. The dielectric layer can be positioned between the uppermost lower insulating layer and the third lower insulating layer.

To remove upper sacrificial layers, the lower sacrificial layers, and the second lower insulating layer in the lower array region, as shown in FIGS. 8-9, a trench opening can be formed to extend from the substrate and through the lower stack and the upper stack. An etching chemistry can be introduced from the trench opening to remove the lower sacrificial layers in the upper array region and the upper staircase region, the upper sacrificial layers in the upper array region and the upper staircase region, and the second lower insulating layer in the lower array region. Accordingly, upper spaces can be formed between the upper insulating layers in the upper array region and the upper staircase region. First lower spaces can be formed between the lower insulating layers in the lower staircase region. Second lower spaces can be formed between the subset of the lower insulating layers in the lower array region, and a third lower space can be formed between the uppermost lower insulating layer and the subset of the lower insulating layers in the lower array region.

Further, as shown in FIG. 10, the upper spaces, the first lower spaces, the second lower spaces, and the third lower space can be filled with a conductive material. Thus, the upper word line layers can be formed between the upper insulating layers in the upper array region and the upper staircase region. The lower word line layers can be formed between the lower insulating layers in the lower staircase region and between the subset of the lower insulating layers in the lower array region. An intermediate word line layer can be formed between the uppermost lower insulating layer and the subset of the lower insulating layers. In addition, the conductive material can further be positioned along sidewalls and a bottom of the trench opening.

As shown in FIG. 11, an etching process can be performed to remove (i) the conductive material from the sidewalls and the bottom of the trench opening and (ii) the intermediate word line layer in the third lower space. The etching process can further recess the lower word line layers and the upper word line layers from the sidewalls of the trench opening to form a slit opening. The slit opening can extend from the substrate and through the lower stack and the upper stack in a vertical direction perpendicular to the substrate. The slit opening can further extend into the upper word line layers and the lower word line layers in a horizontal direction parallel to the substrate. As shown in FIG. 12, a dielectric material can be deposited to fill in the third lower space to form the dielectric layer. The dielectric material can also be filled in the slit opening to form a slit structure.

In the process 1400, as shown in FIG. 5, a lower channel structure can be formed to have a tapered profile and extend from the substrate and through the lower array region of the lower stack. An upper channel structure can be formed to have a tapered profile and extend from the lower channel structure and through the upper array region of the upper stack.

To form the lower stack, the second lower insulating layer can be formed to have a density lower than densities of other lower insulating layers of the lower insulating layers.

In the process 1400, the uppermost lower insulating layer can have a thickness between 19 nm and 21 nm, and the dielectric layer can have a thickness between 60 nm and 80 nm.

In some embodiments, a thickness of the dielectric layer can be equal to a sum of a thickness of the uppermost lower insulating layer and a thickness of two lower word line layers.

In the process 1400, a number of the lower word line layers in the lower array region can be less than a number of the lower word line layers in the lower staircase region.

It should be noted that additional steps can be provided before, during, and after the process 1400, and some of the steps described can be replaced, eliminated, or performed in different order for additional embodiments of the process 1400. For example, dummy channel structures can be formed in the staircase region. Word line contacts can further be formed to extend from the lower word line layers and the upper word line layers in the staircase region. In subsequent process steps, various additional interconnect structures (e.g., metallization layers having conductive lines and/or VIAs) may be formed over the 3D NAND memory device (e.g., 100). Such interconnect structures electrically connect the 3D NAND memory device with other contact structures and/or active devices to form functional circuits. Additional device features such as passivation layers, input/output structures, and the like may also be formed.

Figure 15:
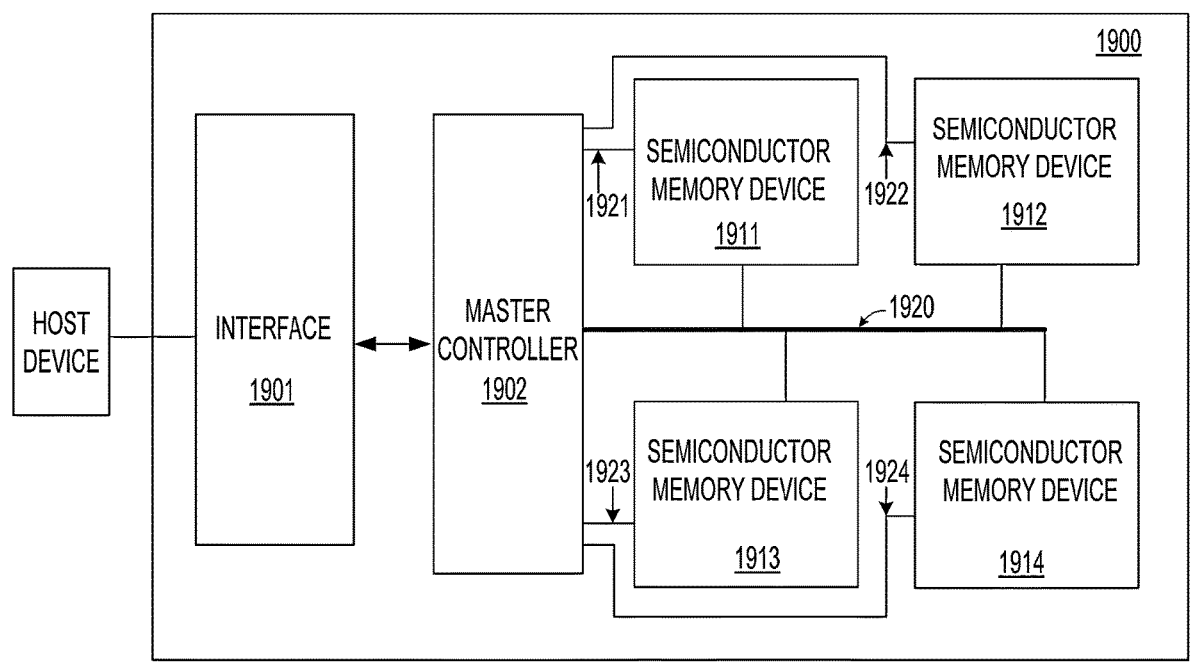
FIG. 15 shows a block diagram of a memory system device according to some exemplary embodiments of the disclosure.

FIG. 15 shows a block diagram of a memory system device 1900 according to some examples of the disclosure. The memory system device 1900 includes one or more semiconductor memory devices, such as shown by semiconductor memory devices 1911-1914, that can be respectively configured similarly as the device 100 in FIGS. 1-2. In some examples, the memory system device 1900 is a solid state drive (SSD) or a memory module.

The memory system device 1900 can include other suitable components. For example, the memory system device 1900 includes an interface (or master interface circuitry) 1901 and a master controller (or master control circuitry) 1902 coupled together as shown in FIG. 15. The memory system device 1900 can include a bus 1920 that couples the master controller 1902 with the semiconductor memory devices 1911-1914. In addition, the master controller 1902 is connected with the semiconductor memory devices 1911-1914 respectively, such as shown by respective control lines 1921-1924.

The interface 1901 is suitably configured mechanically and electrically to connect between the memory system device 1900 and a host device, and can be used to transfer data between the memory system device 1900 and the host device.

The master controller 1902 is configured to connect the respective semiconductor memory devices 1911-1914 to the interface 1901 for data transfer. For example, the master controller 1902 is configured to provide enable/disable signals respectively to the semiconductor memory devices 1911-1914 to activate one or more semiconductor memory devices 1911-1914 for data transfer.

The master controller 1902 is responsible for the completion of various instructions within the memory system device 1900. For example, the master controller 1902 can perform bad block management, error checking and correction, garbage collection, and the like. In some embodiments, the master controller 1902 is implemented using a processor chip. In some examples, the master controller 1902 is implemented using multiple master control units (MCUs).

The various embodiments described herein offer several advantages over related examples. For example, in the 3D NAND memory device of the disclosure, a thick lower insulating layer can be formed in a lower array region of the 3D NAND memory device at an interface (or joint) area of upper channel structures and lower channel structures. When a poor overlap happens between an upper channel structure and a lower channel structure, the upper channel structure can extend into the thick lower insulating layer rather than an adjacent lower word line layer. Accordingly, an electrical leakage in the adjacent lower word line layer or an electrical short between the upper channel structure and the adjacent lower word line layer can be prevented.

In the disclosure, the thickness of the thick lower insulating layer in the lower array region can be three to four times larger than other lower insulating layers in the lower array region. However, the lower insulating layers in the lower staircase region can have a substantially same thickness. The lower insulating layers with a uniform thickness in the lower staircase region can help the etching process to form stairs in the lower staircase region.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A semiconductor device, comprising:
a first stack of alternating first word line layers and first insulating layers over a semiconductor layer, the first stack including a first array region and a first staircase region adjacent to the first array region;
a first channel structure extending from the semiconductor layer and through the first array region of the first stack;
a second stack of alternating second word line layers and second insulating layers over the first stack, the second stack including a second array region over the first array region and a second staircase region adjacent to the second array region and over the first staircase region; and
a second channel structure extending from the first channel structure and through the second array region of the second stack, wherein in the first array region, a thickness of a particular first insulating layer, which is positioned closest to the second stack relative to other first insulating layers, is a sum of at least two times an average thickness of the other first insulating layers and at least one time an average thickness of the first word line layers in the first array region, wherein in the first staircase region, the first stack includes a multi-layer structure including sequentially:
a first layer of the first insulating layers,
a first layer of the first word line layers,
a second layer of the first insulating layers,
a second layer of the first word line layers, and
a third layer of the first insulating layers, wherein the multi-layer structure in the first staircase region is co-planar with the particular first insulating layer in the first array region.

2. The semiconductor device of claim 1, wherein a number of the first word line layers in the first array region of the first stack is less than a number of the first word line layers in the first staircase region of the first stack.

3. The semiconductor device of claim 1, wherein:
the thickness of the particular first insulating layer in the first array region is equal to a sum of thicknesses of at least one first word line layer and at least two first insulating layers in the first staircase region.

4. The semiconductor device of claim 1, further comprising:
a slit structure extending from the semiconductor layer and through the first stack and the second stack.

5. The semiconductor device of claim 1, wherein the particular first insulating layer in the first array region further comprises:
a first layer, a second layer and a third layer, wherein the second layer is sandwiched by the first layer and the third layer.

6. The semiconductor device of claim 5, wherein:
the first layer extends into the first staircase region,
the third layer extends into the first staircase region, and
the second layer, in the first staircase region, has a thickness equal to a sum of a thickness of a given first insulating layer positioned between the first layer and the third layer in the first staircase region and a thickness of two first word line layers positioned between the first layer and the third layer in the first staircase region.

7. The semiconductor device of claim 5, wherein the first layer, the second layer, and the third layer are made of a same dielectric material.

8. The semiconductor device of claim 1, wherein the first channel structure further comprises:
a first tapered profile that includes a first surface extending into the semiconductor layer and a second surface in contact with the second channel structure, the second surface having a larger critical dimension (CD) than the first surface;
a first block layer formed along sidewalls and over the first surface of the first channel structure;
a first charge trapping layer formed over the first block layer;
a first tunneling layer formed over the first charge trapping layer; and
a first channel layer formed over the first tunneling layer.

9. The semiconductor device of claim 8, wherein the second channel structure further comprises:
a second tapered profile that includes a first surface extending from the first channel structure and a second surface having a larger CD than the first surface of the second channel structure, the first surface of the second channel structure having a smaller CD than the second surface of the first channel structure;
a second block layer formed along sidewalls of the second channel structure and in contact with the first block layer;
a second charge trapping layer formed over the second block layer and in contact with the first charge trapping layer;
a second tunneling layer formed over the second charge trapping layer and in contact with the first tunneling layer;
a second channel layer formed over the second tunneling layer and in contact with the first channel layer; and
a channel contact in contact with the second channel layer.

10. The semiconductor device of claim 6, wherein:
the given first insulating layer in the first staircase region has a thickness between 19 nm and 21 nm, and
the particular first insulating layer in the first array region has a thickness between 60 nm and 80 nm.

11. A memory system device, comprising:
control circuitry coupled with a memory device; and
the memory device comprising:
a first stack of alternating first word line layers and first insulating layers over a semiconductor layer, the first stack including a first array region and a first staircase region adjacent to the first array region;
a first channel structure extending from the semiconductor layer and through the first array region of the first stack;
a second stack of alternating second word line layers and second insulating layers over the first stack, the second stack including a second array region over the first array region and a second staircase region adjacent to the second array region and over the first staircase region; and
a second channel structure extending from the first channel structure and through the second array region of the second stack, wherein in the first array region, a thickness of a particular first insulating layer, which is positioned closest to the second stack relative to other first insulating layers, is a sum of at least two times an average thickness of the other first insulating layers and at least one time an average thickness of the first word line layers in the first array region, wherein in the first staircase region, the first stack includes a multi-layer structure including sequentially:
a first layer of the first insulating layers,
a first layer of the first word line layers,
a second layer of the first insulating layers,
a second layer of the first word line layers, and
a third layer of the first insulating layers, wherein the multi-layer structure in the first staircase region is co-planar with the particular first insulating layer in the first array region.

12. The semiconductor device of claim 1, wherein the multi-layer structure is a five-layer structure consisting of sequentially the first layer of the first insulating layers, the first layer of the first word line layers, the second layer of the first insulating layers, the second layer of the first word line layers, and the third layer of the first insulating layers.

13. The semiconductor device of claim 5, wherein:
the first layer of the first insulating layers of the multi-layer structure in the first staircase region is co-planar with the first layer of the particular first insulating layer in the first array region.

14. The semiconductor device of claim 5, wherein:
the third layer of the first insulating layers of the multi-layer structure in the first staircase region is co-planar with the third layer of the particular first insulating layer in the first array region.

15. The semiconductor device of claim 5, wherein:
one surface of the first layer of the first word line layers of the multi-layer structure in the first staircase region is co-planar with one surface the second layer of the particular first insulating layer in the first array region.

16. The semiconductor device of claim 15, wherein:
one surface of the second layer of the first word line layers of the multi-layer structure in the first staircase region is co-planar with another surface the second layer of the particular first insulating layer in the first array region.

17. The semiconductor device of claim 16, wherein:
the one surface of the second layer of the particular first insulating layer and the another surface the second layer of the particular first insulating layer are two opposing surfaces of the second layer of the particular first insulating layer.

18. The semiconductor device of claim 2, wherein:
the thickness of the particular first insulating layer in the first array region is equal to a sum of thicknesses of at least one first word line layer and at least two first insulating layers in the first staircase region.

19. The semiconductor device of claim 2, further comprising:
a slit structure extending from the semiconductor layer and through the first stack and the second stack.

20. The memory system device of claim 11, wherein the multi-layer structure is a five-layer structure consisting of sequentially the first layer of the first insulating layers, the first layer of the first word line layers, the second layer of the first insulating layers, the second layer of the first word line layers, and the third layer of the first insulating layers.

* * * * *